United States Patent Office 2,915,474
Patented Dec. 1, 1959

2,915,474

PREPARATION OF PARTIALLY FROZEN LIQUID MIXTURES

William M. S. Richards, Chatham, N.J., assignor to Celanese Corporation of America, New York, N.Y., a corporation of Delaware No Drawing. Application March 4, 1954
Serial No. 414,221

10 Claims. (Cl. 252—182)

This invention relates to the preparation of frozen liquid mixtures and relates more particularly to the preparation of frozen liquid mixtures of a lower aliphatic acid and a lower aliphatic acid anhydride.

In the production of lower aliphatic acid esters of cellulose, it is the general practice to mix a cellulosic material with a mixture of a lower aliphatic acid and a lower aliphatic acid anhydride in the presence of an esterification catalyst, such as sulfuric acid, to cause the esterification to take place. The esterification reaction is strongly exothermic and tends to cause a rapid rise in the temperature of the esterification mixture. If the temperature of such mixture is permitted to rise unchecked it will reach such high levels as to result in a degradation of the cellulose molecule so that the cellulose ester obtained will not be suited for commercial use. Because of the high viscosity of the esterification mixture, attempts to control the temperature of said mixture through the use of cooling coils, cooling jackets and the other means in which the heat of reaction is absorbed in a cold heat transfer medium are of only limited value. To control the temperature of the esterification reaction it has been the practice to cool the mixture of lower aliphatic acid and lower aliphatic acid anhydride sufficiently to freeze a portion thereof before mixing the same with the cellulosic material. When this is done it is found that during the esterification enough heat is absorbed in melting the frozen material to keep the maximum temperature reached by the esterification mixture at an acceptably low level.

While the freezing of a portion of the mixture of lower aliphatic acid and lower aliphatic acid anhydride enables the peak temperature reached during the esterification reaction to be controlled successfully, it presents a difficult problem itself, owing to the low freezing points of such mixtures. As a result, it is necessary to employ extremely low refrigerant temperatures to freeze such mixtures, which low refrigerant temperatures require the use of more expensive refrigerating equipment. Also, because of the low freezing point of the mixtures of lower aliphatic acid and lower aliphatic acid anhydride, there is usually only a small temperature differential between said mixture, at its freezing point, and the refrigerant, because economic considerations limit the temperature to which it is feasible to cool the refrigerant, so that the rate at which heat is transferred from said mixture to the refrigerant is limited. To freeze any considerable quantity of such mixture, therefore, requires a considerable period of time so that the capacity of the freezing equipment is limited.

It is an important object of this invention to provide a process for the preparation of frozen liquid mixtures of a lower aliphatic acid and a lower aliphatic acid anhydride which will be free from the foregoing and other difficulties.

It is a further object of this invention to provide a process for the preparation of frozen liquid mixtures of a lower aliphatic acid and a lower aliphatic acid anhydride which will enable such freezing to be carried out rapidly and economically.

Other objects of this invention will be apparent from the following detailed description and claims.

According to the present invention, the preparation of frozen mixtures of a lower aliphatic acid and a lower aliphatic acid anhydride is carried out by freezing a lower aliphatic acid containing at most less than the desired proportion of lower aliphatic acid anhydride and then adding thereto a lower aliphatic acid anhydride, preferably after cooling the said anhydride. The lower aliphatic acid containing at most less than the desired proportion of lower aliphatic acid anhydride has a freezing point higher than that of the final mixture. As a result, the lower aliphatic acid may be frozen more rapidly and more economically since the rate of transfer of heat from the acid being frozen to the refrigerant is higher. This permits of the use of less expensive refrigerating equipment and increases the capacity of a given piece of equipment very considerably because the freezing can be completed in much shorter periods of time. The cooling of the lower aliphatic acid anhydride presents no special difficulties because the anhydride has a low viscosity and is not brought to its freezing point during the cooling process so that its cooling can be efficiently carried out in equipment especially designed for cooling liquids, such as tubular heat exchangers and the like, which cannot readily be used for freezing liquids. On mixing the frozen lower aliphatic acid with the lower aliphatic acid anhydride there is obtained a mixture which is partially frozen and which contains the correct proportion of materials.

In applying the present invention, the freezing of the lower aliphatic acid may be carried out either in a continuous manner or on a batch basis. The lower aliphatic acid should be cooled sufficiently so that when the lower aliphatic acid anhydride is added thereto, causing the temperature of the mixture formed to drop since the freezing point of the final mixture is below the freezing point of the acid, there will be obtained a mixture containing the desired proportion of frozen material. To achieve this result, a larger amount of the lower aliphatic acid is frozen initially, or the acid is cooled below its freezing point, and the loss in heat necessary to cool the mixture to its final temperature is absorbed by the melting of a portion of the initially frozen material. While the benefits of this invention are obtained when the lower aliphatic acid being frozen contains a large portion of the lower aliphatic acid anhydride which it is eventually desired to incorporate therein, the best results are obtained when the quantity of anhydride in the lower aliphatic acid being frozen is kept to a maximum of less than about 25% on the weight of the acid. The lower aliphatic acid being frozen should, however, contain at least about 2% by weight of anhydride since when the lower aliphatic acid, itself, is frozen it will yield a solid mass that is difficult to handle.

The addition of the lower aliphatic acid anhydride to the frozen lower aliphatic acid may be carried on either continuously or on a batch basis, depending on the manner of freezing. The use of the process of this invention is desirable even when the proportion of lower aliphatic acid anhydride is quite small, say as low as about 20% by weight or even less, since, for example, the addition of as little as 10% by weight of acetic anhydride to acetic acid causes a drop in freezing point of about 3.5° C. Although the lower aliphatic acid anhydride may be at room temperature when it is added to the frozen lower aliphatic acid, the best results are obtained when the anhydride is first cooled before being added to the acid. The extent of such cooling may vary but should normally be at least to the temperature of the frozen acid or, preferably, at least to the desired final temperature. In this way, the amount of heat which must be absorbed by the melting of the frozen acid is kept to a minimum and the necessary extent of such freezing is reduced.

The process of this invention may be applied to mixtures of any of the lower aliphatic acids such as, for example, acetic, propionic or butyric acids, singly or in combination, with any of the lower aliphatic acid anhydrides, such as, for example, acetic, propionic or butyric anhydrides, singly or in combination.

The following examples are given to illustrate this invention further.

Example I

There is introduced into a jacketed vessel equipped with a scraper stirrer 10 parts by weight of acetic acid and 1.75 parts by weight of acetic anhydride at a temperature of 30° C. and the said mixture is partially frozen (80%) by passing a refrigerant cooled to $-17°$ C. through the jacket. When the temperature of the frozen acetic acid reaches 7° C., there is added thereto 7.46 parts by weight of acetic anhydride that has been precooled to $-8°$ C. The mixture reaches a temperature of $-4.5°$ C. in a period of 17 minutes from the start of cooling. When the same quantities of acetic acid and acetic anhydride are mixed initially and cooled in the same equipment a period of 40 minutes is needed to reach the same temperature.

Example II

There is introduced into a jacketed vessel equipped with a scraper stirrer 10 parts by weight of acetic acid and 1.75 parts by weight of acetic anhydride at a temperature of 30° C. and the said mixture is partially frozen by passing a refrigerant cooled to $-17°$ C. through the jacket. When the temperature of the frozen acetic acid reaches 0° C., there is added thereto 7.46 parts by weight of acetic anhydride at 30° C. The mixture reaches a temperature of $-6.5°$ C. in a period of 30 minutes from the start of cooling. When the same quantities of acetic acid and acetic anhydride are mixed initially and cooled in the same equipment a period of 70 minutes is needed to reach the same temperature.

It is to be understood that the foregoing detailed description is given merely by way of illustration and that many variations may be made therein without departing from the spirit of my invention.

Having described my invention what I desire to secure by Letters Patent is:

1. In the process for the production of a partially frozen mixture of a lower aliphatic acid having 2 to 4 carbon atoms and an anhydride of a lower aliphatic acid having 2 to 4 carbon atoms in a given ratio of acid to anyhdride by the cooling of said acid and anhydride, the improvement which comprises cooling a liquid body comprising said acid and in which the ratio of said acid to said anhydride is greater than said given ratio to at least partially freeze said liquid body, and then adding thereto, as a liquid, the balance of said anhydride while maintaining said liquid body in partially frozen condition, whereby removal of latent heat of fusion is conducted at a higher temperature than is the case when a simple mixture of said acid and said anhydride in said given ratio is cooled directly to produce said partially frozen mixture.

2. Process as set forth in claim 1 and including the step of separately cooling said balance of said anhydride before the addition thereto to said at least partially frozen liquid body.

3. Process as set forth in claim 1 and including the step of separately cooling said balance of said anhydride to a temperature at least as low as that of said partially frozen liquid body before the addition thereto to said at least partially frozen liquid body.

4. Process as set forth in claim 1 in which said liquid body contains up to 25% by weight of said anhydride.

5. Process as set forth in claim 1 in which said liquid body contains 2 to 25% by weight of said anhydride.

6. Process as set forth in claim 1 in which the total proportion of anhydride in the resulting mixture is at least about 20%.

7. Process as set forth in claim 1 in which the total proportion of anhydride in the resulting mixture is at least about 20% and in which said liquid body contains 2 to 25% by weight of said anhydride.

8. Process as set forth in claim 1 in which said acid is acetic acid.

9. Process as set forth in claim 7 in which said acid is acetic acid.

10. In the process for the production of a partially frozen mixture of acetic acid and acetic anhydride by the cooling of said acid and anhydride, the improvement which comprises cooling a mixture consisting of said acid and about 2 to 25% of said anhydride to a temperature of 0 to 7° C. and then adding thereto a liquid consisting of said anhydride and having a temperature of $-8$ to $+30°$ C. in such an amount, ranging from 10 to 74.6% of the weight of said acid, as to produce a partially frozen mixture.

References Cited in the file of this patent

UNITED STATES PATENTS

| | | |
|---|---|---|
| 2,498,010 | Seymour et al. | Feb. 21, 1950 |
| 2,526,761 | Milbrada | Oct. 24, 1950 |

FOREIGN PATENTS

| | | |
|---|---|---|
| 486,901 | Great Britain | June 13, 1938 |
| 489,720 | Great Britain | Aug. 2, 1938 |

OTHER REFERENCES

Handbook of Chemistry and Physics, 28th ed., pp. 556, 557, 562, 563 and 1728, pub. by Chem. Rubber Pub. Co., Akron, Ohio (1944).